US006675761B2

(12) United States Patent
Grassi

(10) Patent No.: US 6,675,761 B2
(45) Date of Patent: Jan. 13, 2004

(54) RING BAND FOR A PISTON

(75) Inventor: John A. Grassi, Brimfield, IL (US)

(73) Assignee: Caterpillar Inc, Peoria, IL (US)

( * ) Notice: Subject to any disclaimer, the term of this patent is extended or adjusted under 35 U.S.C. 154(b) by 11 days.

(21) Appl. No.: 10/060,746

(22) Filed: Jan. 30, 2002

(65) Prior Publication Data

US 2003/0140885 A1 Jul. 31, 2003

(51) Int. Cl.[7] .................................................. F16J 1/04
(52) U.S. Cl. .................................................. 123/193.6
(58) Field of Search ................. 132/193.6; 92/172–260

(56) References Cited

U.S. PATENT DOCUMENTS

| | | | | |
|---|---|---|---|---|
| 1,428,552 A | | 9/1922 | Mullern | |
| 1,817,853 A | | 8/1931 | Small | |
| 1,865,793 A | | 7/1932 | Sawtelle | |
| 2,731,313 A | | 1/1956 | Walker et al. | |
| 2,833,264 A | | 5/1958 | Daley et al. | |
| 2,851,318 A | | 9/1958 | Smith et al. | |
| 3,385,175 A | | 5/1968 | Meier et al. | |
| 3,914,574 A | * | 10/1975 | Hill et al. | 92/213 |
| 4,073,221 A | | 2/1978 | Goloff | |
| 4,137,887 A | | 2/1979 | Dunn | |
| 4,237,846 A | | 12/1980 | Fuchs | |
| 4,375,782 A | | 3/1983 | Schieber | |
| 4,419,925 A | | 12/1983 | Tsuzuki et al. | |
| 4,662,326 A | | 5/1987 | Kohnert | |
| 4,677,901 A | | 7/1987 | Ban et al. | |
| 5,158,052 A | | 10/1992 | Yoshimura | |
| 5,301,599 A | * | 4/1994 | Dearnley et al. | 92/222 |
| 5,425,306 A | * | 6/1995 | Binford | 123/193.6 |
| 6,164,261 A | * | 12/2000 | Kruse | 123/193.6 |
| 6,223,710 B1 | * | 5/2001 | Franz | 123/193.6 |

* cited by examiner

*Primary Examiner*—Marguerite McMahon
(74) *Attorney, Agent, or Firm*—Liza B Myers; William B Heming

(57) ABSTRACT

A piston includes a ring groove. The ring groove has a top face and a bottom face, and one of the top face and the bottom face is composed of a first material having a preestablished rate of thermal conductivity, the other of the top face and bottom face is composed of a second material having a preestablished rate of thermal conductivity being less than the rate of thermal conductivity of the first material.

3 Claims, 1 Drawing Sheet

RING BAND FOR A PISTON

TECHNICAL FIELD

This invention relates to a piston and, more specifically, to a piston having a reinforcing ring band.

BACKGROUND

An internal combustion engine commonly includes a crankshaft and a plurality of cylinders, each cylinder having a piston, combustion chamber, glow plug or spark plug, and connecting rod. The piston and connecting rod are used to transmit power from the combustion chamber to the crankshaft. It is important for the interface of the combustion chamber and the piston to be sealed; this sealing is normally accomplished with a piston ring. The piston normally includes one or more piston rings which are each positioned by an annular ring groove.

The piston rings seal the combustion chamber between the piston and the cylinder wall. As the engine operates, combustion occurs and high temperatures are achieved in the combustion chamber. A portion of the heat from the combustion is absorbed in the piston and, for efficiency and longevity of the piston, must be channeled away from the piston by the rings to the walls of the combustion chamber.

Since aluminum conducts heat well, aluminum is used in manufacturing many pistons. However, since aluminum is very soft, as the piston travels in the cylinder, the piston rings tend to wear and disform the ring grooves, causing distortion of the ring groove configuration and exceeding design tolerances. This wear can result in a loss of sealing of the combustion chamber. This situation is exacerbated by the common practice of placing a twist or bias on the piston rings, which causes greater wear of the ring grooves.

It is thus common in the art to form the ring grooves in a ring band, of iron or another material having a higher wear characteristic than that of aluminum. The band is bonded to the piston during manufacture thereof. This ring band is intended to reinforce the piston such that the piston rings do not cause undue wear to the piston itself. Unfortunately, the material of the ring band often is a poorer conductor of heat than aluminum. Thus, the transfer of heat from the piston through the piston rings to the cylinder wall is impeded by this difference in conduction, resulting in less heat transfer than is desired.

U.S. Pat. No. 5,746,169, issued May 5, 1998 to Wolfgang Issler et al. (hereafter referenced as '169) discloses a piston including a ring band. '169 discloses several ring grooves, but only the topmost one of these grooves is formed in a reinforcing ring band. This is commonly done to try to balance the need for robust sealing of the combustion chamber with effective heat conduction. Each ring groove of '169 therefore has a disadvantage in either heat conduction or wear resistance. Should the piston rings of '169 be configured with a twist or bias to exert a greater force on one face of the ring grooves, wear on that face will be hastened, thus necessitating replacement of the piston.

The present invention is directed to overcoming one or more of the problems as set forth above.

SUMMARY OF THE INVENTION

In an embodiment of the present invention, a piston including a body portion, a ring band, and a ring groove is provided. The body portion is composed of a first material having a preestablished rate of thermal conductivity. The ring band is composed of a second material having a preestablished rate of thermal conductivity that is less than the rate of thermal conductivity of the first material. The ring groove has a top face and a bottom face. One of the top face and the bottom face is formed by the first material and the other of the top face and the bottom face is formed by the second material.

In an embodiment of the present invention, an engine is provided. The engine includes a combustion chamber, a connecting rod, a piston, and at least one ring groove. The piston is composed of a first material having a preestablished rate of thermal conductivity and a second material having a preestablished rate of thermal conductivity different from the rate of thermal conductivity of the first material. The piston is attached to the connecting rod. The ring groove is partially positioned in each of the first material and the second material.

In an embodiment of the present invention, a method of reinforcing a piston is provided. The piston has at least one annular groove having a top face and a bottom face. The method includes the steps of providing a piston of a first material, providing a band of a second material having a preestablished rate of thermal conductivity less than the rate of thermal conductivity of the first material, bonding the band to the piston, forming one of the top face and the bottom face in the first material, and forming the other of the top face and the bottom face in the second material.

In an embodiment of the present invention, a piston is provided. The piston includes a first material, a second material, at least one ring groove, and a piston ring. The ring groove is partially positioned in each of the first material and the second material. The piston ring is positioned in the ring groove.

In an embodiment of the present invention, a method of operating a reinforced piston is provided. The method includes the steps of providing a ring groove formed in the piston and having at least one wall portion comprised of each of a first material and a second material, providing a piston ring partially contained in the ring groove, moving the piston inside a cylinder in a reciprocating manner, and contacting the cylinder with the piston ring. The method also includes the steps of transferring heat from the piston to the piston ring to the cylinder via the first material, and resisting wear of the ring groove from the piston ring via the second material.

DETAILED DESCRIPTION

Figure 1:
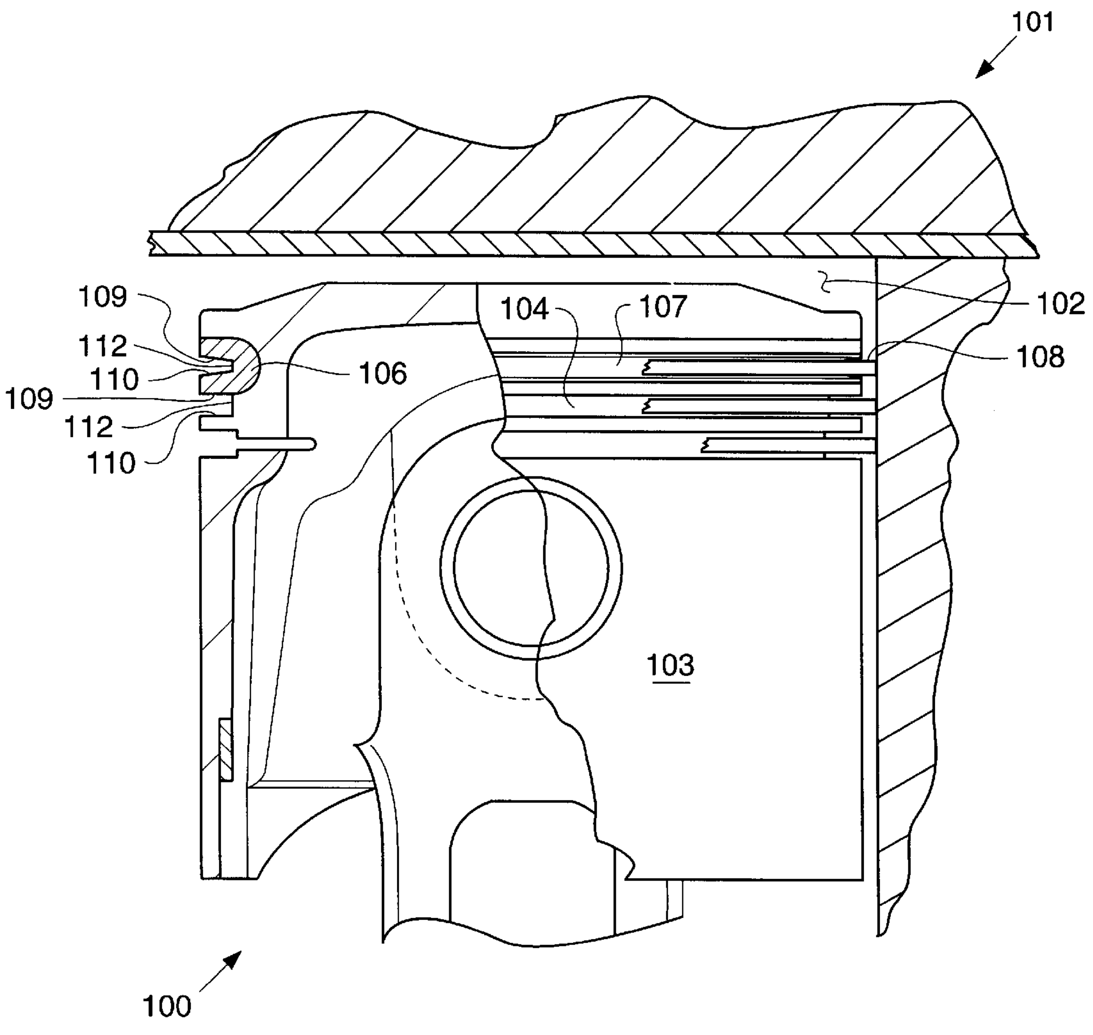
FIG. 1 is a cutaway side view of an engine having an embodiment of the present invention.

An embodiment of the present invention provides an apparatus and method of reinforcing a piston 100 in an internal combustion engine 101 having a combustion chamber 102. In this application, the internal combustion engine 101 is a compression ignition engine. However, as an alternative, the internal combustion engine 101 could be a spark ignited engine. As another alternative, the piston 100 could be used in other applications, such as a compressor or a pump.

FIG. 1 depicts a piston 100 including a body portion 103, which is composed of a first material. A first ring groove 104 is partially formed in the body portion 103. A ring band 106, composed of a second material having a preestablished rate of thermal conductivity being different than the rate of thermal conductivity of the first material, is positioned in the body portion 103. In the embodiment shown in FIG. 1, a second ring groove 107 is formed in the ring band 106. The ring band 106 is normally annular in shape. Additional ring groove(s) 104, 107 may be formed in either of the ring band 106 or the body portion 103 without changing the gist of the invention.

In this application, the first material is an aluminum alloy and the second material is an iron alloy. The ring band 106 is bonded to any suitable part of the body portion 103, including the top, walls, bottom, inside, or the like, in a fixed manner during manufacture of the piston 100. This may be accomplished by placing a pre-formed iron ring band 106 into a mold which is used to form the piston 100 by casting aluminum into the mold.

Typically, each ring groove 104, 107 receives a piston ring 108. Each of the first and second ring grooves 104, 107 includes a top face 109, a bottom face 110, and preferably an inner face 112, connecting the top face 109 and the bottom face 110. The first ring groove 104 within the body portion 103 has a top face 109 or a bottom face 110, but not both, formed by the ring band 106 which is composed of the second material. The ring grooves 104, 107 may be of an annularly symmetric cross section (one in which the top face 109 is substantially parallel to the bottom face 110), or they may be of an annularly asymmetric cross section (one in which the top face 109 and bottom face 110 have a relationship other than parallel).

A piston ring 108 is located as described above in at least one of the first and second ring grooves 104, 107 and contacts the cylinder walls and at least one of the top, bottom, and inner face 109,110,112 of the chosen ring groove 104,107. There may optionally be a piston ring 108 in the ring groove(s) 104,107 that was not chosen, but the presence of a piston ring 108 in each ring groove 104,107 is not essential to the present invention. The description below, for the sake of convenient description, assumes that each ring groove 104,107 carries a piston ring 108. This should not be construed to limit the present invention.

For purposes of this example, only the top face 109 of the first ring groove 104 will be described as being formed by the ring band 106 which is composed of the second material, as shown in FIG. 1. In practice, any number of ring grooves 107 may be formed in the ring band 106 which is composed of the second material. Also in practice, any number of additional ring grooves 104 may be formed in the piston body 103 composed of the first material. These additional ring grooves 104,107 may provide advantages in sealing and in heat transfer from the piston 100. However, in operation, at least one ring groove 104 must have one of the top and bottom surfaces 109,110 formed by the ring band 106 and the other of the top and bottom surfaces 109,110 formed by the piston body 103. The inner face 112 can be in either of the ring band 106 or the piston body 103.

While aspects of the present invention have been particularly shown and described with reference to the particular embodiment(s) above, it will be understood by those skilled in the art that various additional embodiments may be contemplated without departing from the spirit and scope of the present invention. For example, (1) the ring band 106 may be of a different form than that shown, for example, the ring band 106 may have a different cross-sectional shape, such as U-shaped or V-shaped when viewed in profile; (2) the ring band 106 may not completely encircle the body portion 103; (3) the first material and second material may be different than the examples given and may have different relationships of thermal conductivity; (4) the top face 109 or bottom face 110 may not be parallel one to the other; (5) the method of manufacture of the piston 100 may include a different method of attaching the ring band 106, for example, laser cladding; or, (6) there may be materials other than the first and second materials present in the body portion 103 and/or forming the top, bottom, and inner faces 109,110,112. However, a device or method incorporating such an embodiment should be understood to fall within the scope of the present invention as claimed below.

Industrial Applicability

As the piston 100 travels in the cylinder of the engine 101, each piston ring 108 provides a sealing aspect to the contact between the piston 100 and the wall of the cylinder. This seal is desirable because it keeps oil and other contaminants from entering the combustion chamber 102 and simultaneously keeps gaseous/vapor ignition byproducts from escaping the combustion chamber 102 to allow for efficient operation of the engine 101. Heat is conducted from the piston 100 to the cylinder wall through the piston ring 108 as described above. Due to the reciprocating action of the piston 100 and the tight fit between the piston 100 and the cylinder, the piston ring 108 is frequently forced up and down within the ring groove 104. The piston ring 108 can become twisted from its installed/neutral position during travel of the piston 100. Additionally, it is common for the piston ring 108 to be initially installed in the ring groove 104 with an intentional slight bias or twist to strengthen the seal between the piston 100 and the cylinder. The effect of these twists and position changes is to cause greater wear on the ring groove 104 due to the piston ring's 108 contact.

With one of the top or bottom surface 109,110 formed by the second material of the ring band 106, wear caused by the force of the piston ring 108 is resisted. And, with the respective one of the top and bottom surface 109, 110 positioned in the first material of the piston body 103, heat is efficiently and timely transferred from the combustion chamber 102.

The apparatus and method of certain embodiments of the present invention, when compared with other methods and apparatus, may have the advantages of: impeding wear of the ring grooves; and facilitating conduction of heat.

Other aspects, objects, and advantages of the present invention can be obtained from a study of the drawings, the disclosure, and the appended claims.

What is claimed is:

1. A piston comprising:

a body portion being composed of a first material having a pre-established rate of thermal conductivity;

a ring band being composed of a second material having a pre-established rate of thermal conductivity that is less than the rate of thermal conductivity of the first material;

a ring groove having a top face and a bottom face, wherein one of the top face and the bottom face is formed by the first material and the other of the top face and the bottom face is formed by the second material; and an additional ring groove being formed in the ring band and having a top face and a bottom face each formed by the second material.

2. The piston of claim 1, wherein the first material is an aluminum alloy and the second material is an iron alloy.

3. The piston of claim 1, wherein the ring band is fixed to the body portion at a location below the top of the piston.

* * * * *